US007780042B2

(12) United States Patent
Pruvot

(10) Patent No.: US 7,780,042 B2
(45) Date of Patent: Aug. 24, 2010

(54) FLUID DISPENSER PUMP

(75) Inventor: Samuel Pruvot, Saint Etienne du Vauvray (FR)

(73) Assignee: Valois S.A.S., Le Neubourg (FR)

( * ) Notice: Subject to any disclaimer, the term of this patent is extended or adjusted under 35 U.S.C. 154(b) by 0 days.

(21) Appl. No.: 12/293,478

(22) PCT Filed: Mar. 20, 2007

(86) PCT No.: PCT/FR2007/050966

§ 371 (c)(1),
(2), (4) Date: Sep. 18, 2008

(87) PCT Pub. No.: WO2007/107672

PCT Pub. Date: Sep. 27, 2007

(65) Prior Publication Data

US 2009/0255959 A1 Oct. 15, 2009

(30) Foreign Application Priority Data

Mar. 22, 2006 (FR) .................................. 06 50995

(51) Int. Cl.
*G01F 11/00* (2006.01)

(52) U.S. Cl. .................. 222/321.7; 222/321.6; 222/340

(58) Field of Classification Search .............. 222/321.1, 222/321.6, 321.8, 321.2, 321.7, 321.9, 372–385, 222/340, 341; 239/333
See application file for complete search history.

(56) References Cited

U.S. PATENT DOCUMENTS

| | | | | |
|---|---|---|---|---|
| 4,640,443 | A * | 2/1987 | Corsette | 222/321.6 |
| 2005/0098583 | A1* | 5/2005 | Mbonyumuhire | 222/321.7 |
| 2007/0131799 | A1 | 6/2007 | Le Maner et al. | |
| 2007/0272712 | A1* | 11/2007 | Pardonge et al. | 222/321.6 |
| 2007/0272713 | A1* | 11/2007 | Le Maner | 222/321.6 |
| 2007/0295756 | A1* | 12/2007 | Pardonge et al. | 222/321.7 |

FOREIGN PATENT DOCUMENTS

FR 2 862 009 A1 5/2005

* cited by examiner

*Primary Examiner*—Kevin P Shaver
*Assistant Examiner*—Jonathan Wood
(74) *Attorney, Agent, or Firm*—Sughrue Mion, PLLC

(57) ABSTRACT

A fluid dispenser pump having: a pump body; a pump chamber; at least a first piston that slides in the pump chamber between a rest position and an actuated position so as to dispense the fluid; and a dispenser orifice; the pump chamber including an inlet valve that separates the pump chamber from a channel that extends towards a fluid reservoir, a bypass being provided between the channel and the pump chamber, the bypass being disposed upstream from the inlet valve, the bypass connecting the pump chamber to the reservoir when the piston is in its actuated position.

14 Claims, 1 Drawing Sheet

FLUID DISPENSER PUMP

CROSS REFERENCE TO RELATED APPLICATION

This application is a National Stage of International Application No. PCT/FR2007/050966 filed Mar. 20, 2007, claiming priority based on French Patent Application No. 0650995, filed Mar. 22, 2006, the contents of all of which are incorporated herein by reference in their entirety.

FIELD OF THE INVENTION

The present invention relates to a fluid dispenser pump and to a fluid dispenser device including such a pump.

BACKGROUND

Fluid dispenser pumps are well known in the state of the art, in particular for dispensing fluids, liquids, or pastes in the fields of cosmetics, perfumery, or pharmacy. They generally include a piston that slides in a pump body, more particularly in a pump chamber provided in the pump body, and that is adapted to dispense a dose of fluid each time the pump is actuated. The pump chamber generally includes an inlet valve so as to make it possible to define the dose of fluid expelled on each actuation. In addition, in particular with pharmaceuticals, pumps sometimes incorporate plugs for their dispenser orifices, so as to avoid any contamination of the fluid between two actuations.

A problem that occurs with that type of pump relates to priming. Before the pump is actuated for the first time, the pump chamber is full of air, and it is thus necessary to expel all of the air so as to enable said pump chamber to be filled with fluid, and so as to enable accurate and reproducible metering each time the pump is actuated. Priming is made all the more complicated when the pump includes a plug. It is difficult to expel the air contained in the pump chamber out from said pump chamber, in particular because of the presence of said plug.

Another problem that can occur with fluid dispenser pumps relates to the quality of the spray, when said pump is a spray pump. Particularly when a plug is provided for the dispenser orifice, the quality and the characteristics of the spray during expulsion depend on said plug. Unfortunately, since most plugs are moved by the fluid pressure created during actuation, actuations with different intensities or axial forces can cause the characteristics of the spray to change. In particular in pumps in which the plug moves axially away from the dispenser orifice during actuation of the pump, too great a displacement of said plug risks causing a loss in the quality of the spray, and consequently poor dispensing of the dose.

Another problem that can also occur with fluid dispenser pumps relates to the risk of the pump becoming blocked. In particular, this risk can occur with so-called "airless" suction pumps if the suction in the fluid reservoir exceeds the suction that the pump or metering chamber is capable of generating when the pump returns to its rest position after actuation. The inlet valve of the pump chamber can thus become blocked, thereby blocking the pump as a whole. In this event, the natural suction capability of the pump is insufficient to counter the suction from the reservoir, if the suction level is not always relayed to the pump chamber after each actuation. Unfortunately, as a pump is used, some of its component parts, generally those made of plastics material that is more or less rigid, risk deforming naturally under the effect of the suction, and are thus likely to generate this disadvantageous increase in reservoir suction relative to pump-chamber suction.

An object of the present invention is to provide a fluid dispenser pump that does not have the above-mentioned drawbacks.

OBJECTS OF THE INVENTION

More particularly, an object of the present invention is to provide a fluid dispenser pump that avoids any risk of the pump becoming blocked, in particular by avoiding an excessive increase in reservoir suction relative to pump-chamber suction.

Another object of the present invention is to provide a fluid dispenser pump that makes it possible to provide priming that is safe and reliable, in simple and inexpensive manner.

Another object of the present invention is to provide a fluid dispenser pump that guarantees spraying each time the pump is actuated, regardless of the force exerted by the user on said pump during its actuation.

The present invention also provides a fluid dispenser pump that is simple and inexpensive to manufacture and to assemble.

The present invention thus provides a fluid dispenser pump comprising: a pump body; a pump chamber; at least a first piston that slides in said pump chamber between a rest position and an actuated position so as to dispense the fluid; and a dispenser orifice; said pump chamber including an inlet valve that separates the pump chamber from a channel that extends towards a fluid reservoir, a bypass being provided between said channel and said pump chamber, said bypass being disposed upstream from said inlet valve, said bypass connecting the pump chamber to the reservoir when the piston is in its actuated position.

Advantageously, the inlet valve comprises both a valve member and a valve seat that is secured to the first piston, said first piston sliding in leaktight manner in said pump body, said pump body including at least one opening that co-operates with the first piston in its actuated position so as to open said bypass and enable pressure to be equalized between the pump chamber and the reservoir.

Advantageously, said pump includes a dispenser head that incorporates said dispenser orifice.

Advantageously, said pump includes a plug that is displaceable and/or deformable between a closed position of the dispenser orifice and an open position of the dispenser orifice.

Advantageously, said plug includes at least a second piston that co-operates in leaktight manner with the head, in any position.

Advantageously, the pump body is made integrally with said plug.

Advantageously, said plug is urged resiliently, in particular by a spring, towards its closed position, and is moved and/or deformed towards its open position by the pressure of the fluid contained in the pump chamber.

Advantageously, the valve member is a ball.

Advantageously, a single spring urges said first piston towards its rest position, and said plug towards its closed position.

Advantageously, said spring does not come into any contact with the fluid.

Advantageously, said first piston and said valve seat are made integrally with a fastener element, such as a snap-fastenable, crimpable, or screw-fastenable ring, that is adapted to fasten said pump on a fluid reservoir.

Advantageously, said first piston is secured to a hollow rod that forms, at least in part, said channel, said inlet valve, and said bypass.

Advantageously, said hollow rod is connected to a dip tube that extends into said reservoir.

Advantageously, said hollow rod includes, in or on its outside surface, between said bypass and said first piston, passage means that guarantee a connection between the pump chamber and the bypass when the first piston is in its actuated position, regardless of the deformation of the components of the pump under the effect of the suction generated on each actuation.

Advantageously, said passage means comprise at least one groove and/or spline.

The present invention also provides a fluid dispenser device comprising a fluid reservoir and a pump as described above.

BRIEF DESCRIPTION OF THE DRAWINGS

Other characteristics and advantages of the present invention appear more clearly from the following detailed description thereof, given by way of non-limiting example, and with reference to the accompanying drawing, in which.

Figure 1:
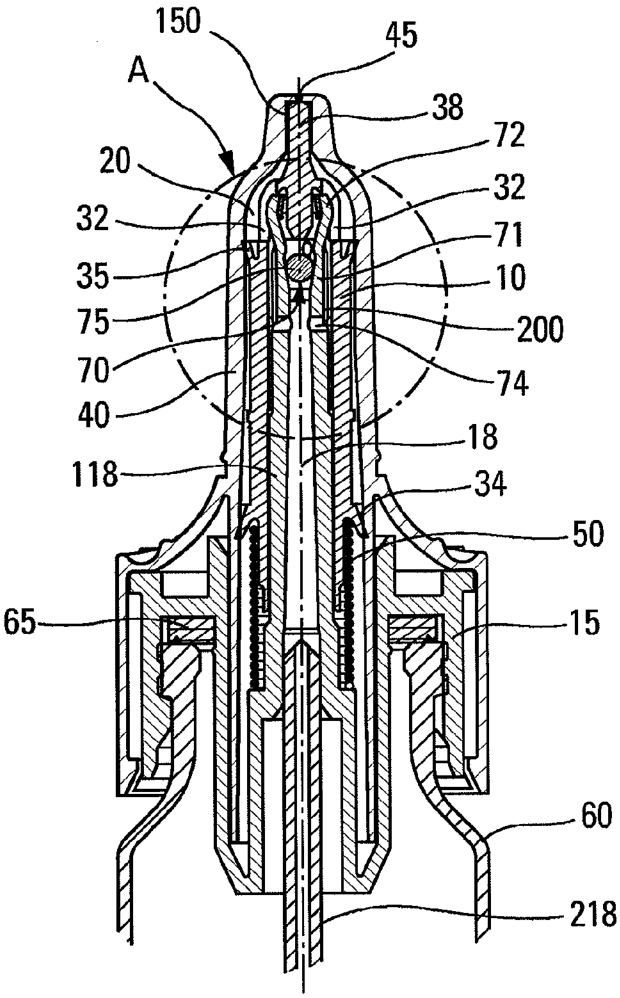
FIG. 1 is a diagrammatic section view of a fluid dispenser device including a pump constituting an advantageous embodiment of the present invention, in its actuated position.
Figure 2:
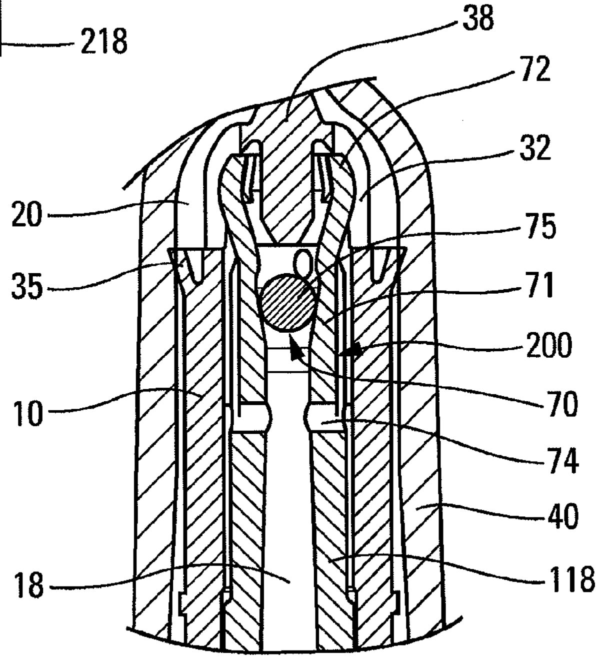
FIG. 2 is a larger-scale detail view of the portion A in FIG. 1.

Detailed Description of Certain Embodiments of the Invention

With reference to the figures, the dispenser pump of the present invention includes a pump body 10 in which at least a first piston 72 slides between a rest position and an actuated position (shown in the figures). The first piston 72 defines, in part, a pump chamber 20, and actuating the pump causes a dose of fluid contained in the pump chamber 20 to be dispensed through a dispenser orifice 45, preferably formed in a dispenser head 40. The pump can advantageously include a plug 38 that is disposed directly upstream from the dispenser orifice 45, and that co-operates with said dispenser orifice by being movable and/or deformable between a closed position of the dispenser orifice 45 and an open position thereof. The pump chamber 20 includes an inlet valve 70 that can be provided in the form of a ball 75 that forms a valve member and that co-operates with a valve seat 71. The valve member 75 is shown in the form of a ball, but it could be provided in some other form. The pump body 10 is preferably formed integrally with the plug 38, and inside it. The piston 72 and the valve seat 71 are advantageously secured to a hollow rod 118 that can also incorporate a fastener ring 15 that is adapted to fasten the pump on a reservoir 60 containing the fluid, advantageously with a sealing gasket 65 interposed therebetween. The hollow rod 118 defines a channel 18 that extends towards the reservoir 60. A dip tube 218 for extending to the bottom of the reservoir 60 so as to dispense all of the fluid contained therein can also be connected to, or made integrally with, said hollow rod 118.

Advantageously, the pump includes only one spring 50 that is adapted to return the first piston 72 towards its rest position and the plug 38 towards its closed position after each actuation. The spring 50 advantageously does not come into any contact with the fluid, thereby eliminating any risk of spoiling the fluid in question. The plug 38 advantageously slides axially between its open and closed positions in a sleeve 150 provided in the bottom of the actuator head 40. A spray profile (not shown) is preferably formed in said sleeve so as to enable the fluid to swirl while being expelled, so as to form a spray.

Advantageously, said plug 38 includes at least a second piston 34 that co-operates in leaktight manner with the dispenser head 40, in any position. The plug 38 advantageously includes a second piston 34 that makes it possible to isolate the spring 50, and a third piston 35 that defines the pump chamber 20.

A bypass 74 is provided between the channel 18 and the pump chamber 20, upstream from the inlet valve 70. The bypass 74 firstly enables the pump chamber 20 to be connected to the channel 18 while the pump is being primed. In particular, the bypass 74 can be made in the form of a lateral borehole formed in the valve seat 71 upstream from the valve member 75. The valve seat 71 is thus advantageously disposed upstream from the first piston 72 that slides in leaktight manner in said pump body 10, said pump body including at least one opening 32 that is adapted to co-operate with said first piston 72 during priming. It should be noted that when the user actuates the pump for the first time, and when said pump contains air in the pump chamber 20, the air becomes compressed, thereby closing the inlet valve 70 by pressing the ball 75 against the valve seat 71. Since air is compressible, the first piston 72 can slide in the pump body 10 without the plug 38 moving relative to the dispenser head 40. When the first piston 72 arrives at the opening 32 of the pump body 10, a passage is created between the pump chamber 20 and the bypass 74, thereby making it possible for the air contained in the pump chamber 20 to be expelled towards the channel 18, and thus into the reservoir 60. After priming, when the pump is returned to its rest position, fluid is sucked into the pump chamber 20. Thereafter, the first piston 72 can no longer reach said opening 32 of the pump body during normal operation of the pump, i.e. while the fluid is being dispensed, but only at the end of actuation, in the actuated position of the first piston 72. Said inlet valve 70 thus functions in conventional manner so as to close during actuation and open when the pump is returned to its rest position.

In the invention, the bypass 74 also enables the pump chamber 20 to be connected to the channel 18, and thus to the reservoir 60, when the first piston 72 reaches its actuated position. This makes it possible to equalize pressure in the pump chamber 20 and in the reservoir 60, and thus prevents the increase in the suction in the reservoir relative to the suction in the pump chamber, which would otherwise risk blocking the pump by preventing the inlet valve 70 of the pump chamber from opening.

Passage means 200 are advantageously provided so as to guarantee the connection between the pump chamber 20 and the bypass 74 when the first piston 72 is in its actuated position. The passage means can comprise one or more grooves and/or splines, and more generally any type of profile. The passage means 200 are preferably formed in or on the outside surface of the internal rod 118, the top end of which forms the first piston 72. The passage means 200 are advantageously provided between the bypass 74 and said at least one opening 32 of the pump body 10. The presence of the passage means 200 makes it possible to avoid the passage becoming blocked or obstructed, e.g. because of the natural deformation of certain component parts of the pump, which can occur under the effect of the suction generated on each actuation. As a result of connecting the pump chamber 20 to the reservoir 60 at the end of each actuation, making it possible to prevent any increase in the suction in the reservoir relative to the suction in the pump chamber, the tendency of certain parts of the pump to deform is also limited. The present invention thus provides a pump that does not present any risk of blockage.

The bypass 74 provided upstream from the inlet valve 70 of the pump chamber 20 thus provides two functions, namely firstly a passage for passing air during priming, and secondly a passage for equalizing pressure between the pump chamber and the reservoir after each actuation, so as to guarantee good operation of the pump.

The invention is described above with reference to a particular embodiment thereof, but naturally various modifications could be made thereto. In particular, the dip tube 218 could be made integrally with the hollow rod 118 and/or with the fastener element 15 that fastens the pump on the reservoir 60. In addition, the shapes of the plug 38, the pump body 10, the first piston 72, the inlet valve 70 of the pump chamber 20, or the other elements could be made differently if necessary. Other modifications could also be envisaged by the person skilled in the art, without going beyond the ambit of the present invention, as defined by the accompanying claims.

The invention claimed is:

1. A fluid dispenser pump comprising: a pump body; a pump chamber; at least a first piston that slides in said pump chamber between a rest position and an actuated position so as to dispense the fluid; and a dispenser orifice; said pump chamber including an inlet valve that separates the pump chamber from a channel that extends towards a fluid reservoir, a bypass being provided between said channel and said pump chamber, said bypass being disposed upstream from said inlet valve, wherein said bypass connects the pump chamber to the reservoir when the piston is in its actuated position, each time the pump is actuated;

wherein said first piston is secured to a hollow rod that forms, at least in part, said channel, said inlet valve, and said bypass;

wherein said hollow rod includes, in or on its outside surface, between said bypass and said first piston, a passage that connects the pump chamber and the bypass when the first piston is in its actuated position, regardless of the deformation of the components of the pump under the effect of the suction generated on each actuation; and wherein the bypass is a lateral borehole formed in a valve seat upstream of the valve inlet.

2. A pump according to claim 1, in which the inlet valve comprises both a valve member and the valve seat that is secured to the first piston, said first piston sliding in leaktight manner in said pump body, said pump body including at least one opening that co-operates with the first piston in its actuated position so as to open said bypass and enable pressure to be equalized between the pump chamber and the reservoir.

3. A pump according to claim 1, in which said pump includes a dispenser head that incorporates said dispenser orifice.

4. A pump according to claim 1, in which said pump includes a plug that is displaceable and/or deformable between a closed position of the dispenser orifice and an open position of the dispenser orifice.

5. A pump according to claim 4, wherein the pump comprises a dispenser head that incorporates the dispenser orifice and in which said plug includes at least a second piston that co-operates in leaktight manner with the head, in any position.

6. A pump according to claim 4, in which the pump body is made integrally with said plug.

7. A pump according to claim 4, in which said plug is urged resiliently, in particular by a spring, towards its closed position, and is moved or deformed towards its open position by the pressure of the fluid contained in the pump chamber.

8. A pump according to claim 2, in which the valve member is a ball.

9. A pump according to claim 4, in which a single spring urges said first piston towards its rest position, and said plug towards its closed position.

10. A pump according to claim 9, in which said spring does not come into any contact with the fluid.

11. A pump according to claim 1, in which said first piston and said valve seat are made integrally with a fastener element, such as a snap-fastenable, crimpable, or screw-fastenable ring, that is adapted to fasten said pump on the fluid reservoir.

12. A pump according to claim 1, in which said hollow rod is connected to a dip tube that extends into said reservoir.

13. A pump according to claim 1, in which said passage means comprise at least one groove or spline.

14. A fluid dispenser device including a fluid reservoir, said device being characterized in that it further includes a pump according to claim 1.

* * * * *